Patented June 13, 1950

2,511,815

UNITED STATES PATENT OFFICE 2,511,815

PREPARATION OF VINYL-ALKOXY-CARBOCYCLIC COMPOUNDS

William Edwin Scott, Essex Fells, and Moses Wolf Goldberg, Upper Montclair, N. J., assignors to Hoffman-La Roche Inc., Nutley, N. J., a corporation of New Jersey No Drawing. Application December 31, 1948, Serial No. 68,748

7 Claims. (Cl. 260—611)

The present invention relates to the preparation of 1-methyl-2-vinyl-4-lower alkoxy-cyclohexenes, which are new compounds and can be represented by the following formula:

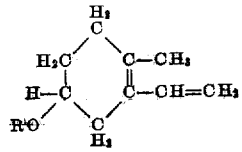

R standing for a lower alkyl radical, as for example, methyl, ethyl, and the like.

According to the present invention, 2-hydroxy-4-alkoxy-toluene (I) is hydrogenated to 1-methyl-2-hydroxy-4-alkoxy-cyclohexane (II), the latter compound oxidized to 1-methyl-2-keto-4-alkoxy-cyclohexane (III), which is condensed with lithium acetylide to form 1-methyl-2-hydroxy-2-ethinyl-4-alkoxy-cyclohexane (IV), the latter compound then subjected to dehydration to split out one molecule of water, forming 1-methyl-2-ethinyl-4-alkoxy-cyclohexene (V) which is partially hydrogenated to form 1-methyl-2-vinyl-4-alkoxy-cyclohexene (VI). If compound (IV) is partially hydrogenated, 1-methyl-2-hydroxy-2-vinyl-4-alkoxy-cyclohexane (VII) results.

The procedure can be represented schematically as follows:

The compounds (II) through (VII) are all new, and are embraced within the present invention.

They can be represented by the following generic formulae:

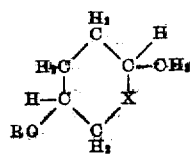

and

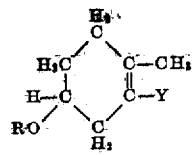

wherein X is a member of the group consisting of C(OH)H, C=O, C(OH)C≡CH and

C(OH)CH=CH₂

Y stands for C≡CH and CH=CH₂, and R is a lower alkyl.

Hydrogenation of (I) to (II) can be carried out in any suitable manner, for example, by catalytic hydrogenation, employing a catalyst such as Raney nickel. Oxidation of (II) to (III) is effected by means of any suitable oxidizing agent. Chromic acid has been found to be especially

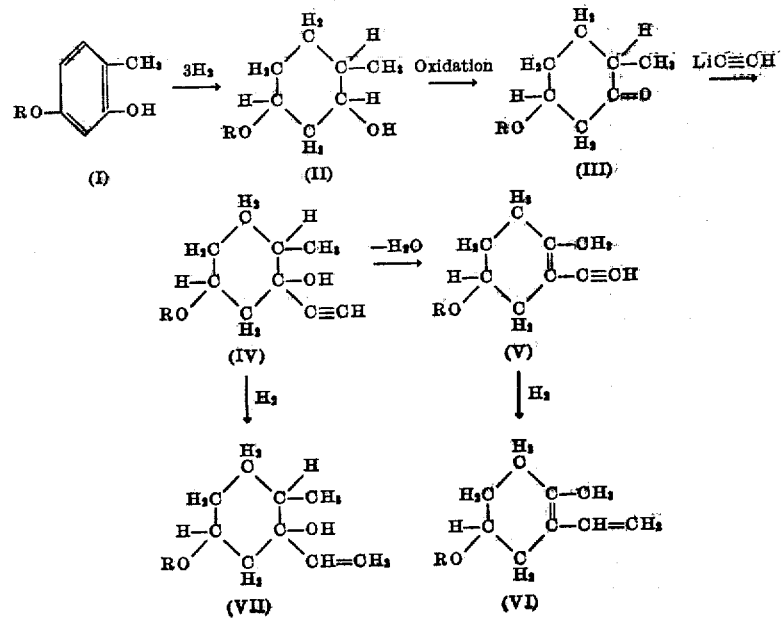

effective for this purpose. Condensation of (III) with lithium acetylide gives the highest yields of (IV) when carried out in the presence of a solvent, such as ether. Dehydration of (IV) is carried out with a dehydrating agent such as thionyl chloride in the presence of an acid binding agent, for example, pyridine or quinoline. The reduction of compound (V) to compound (VI) and (IV) to (VII) can be carried out in any suitable manner, such as by partial catalytic hydrogenation, for example, using a palladium catalyst.

The new vinyl-cyclohexenes are useful intermediates for the synthesis of polycyclic compounds related to the steroids.

The following examples will serve to illustrate the invention.

Example 1

330 grams of 2-hydroxy-4-methoxy-toluene in 1100 cc. of methanol were hydrogenated with 70 grams of Raney nickel at 1800 pounds per square inch pressure and 135° C. for 50 hours. After filtration from the catalyst and removal of the solvent, the residue was taken up in ether and washed with 10 per cent sodium hydroxide solution. This removed unhydrogenated starting material. The residue from the ether solution was distilled at 8 mm. to obtain 1-methyl-2-hydroxy-4-methoxy-cyclohexane. Boiling range 74–93° C.

Example 2

To a stirred solution of 244 grams of the above described 1-methyl-2-hydroxy-4-methoxy-cyclohexane in 2600 cc. of benzene was added, dropwise, a solution of 143 grams of chromium trioxide in 214 cc. of acetic acid and 214 cc. of water, at such a rate as to keep the temperature at 50° C. The reaction mixture was then stirred at 50° C. for three hours. The benzene layer was then separated, washed with water and finally with sodium carbonate solution, until the acetic acid was removed. After removal of the benzene, the residue was distilled at 8 mm. to obtain 1-methyl-2-keto-4-methoxy-cyclohexane. B. P. 83–87° C.

Example 3

3.5 grams of lithium were dissolved in 300 cc. of liquid ammonia. Acetylene was bubbled into the stirred solution at −40° C. until the solution was decolorized and for an additional 15 minutes. The ammonia was then distilled off until a thick paste of lithium acetylide remained. This was suspended in 250 cc. of dry ether, and 25 grams of 1-methyl-2-keto-4-methoxy-cyclohexane in 100 cc. of ether were added to the stirred suspension over a period of one and one-half hours. Stirring was continued for three hours at room temperature, at which time the solution was practically clear. The ether solution was then poured into a mixture of 29 grams of ammonium chloride and ice. The ether layer was separated, washed with dilute sulfuric acid, 10 per cent sodium bicarbonate, and dried. After removal of the ether, the residue was distilled at 8 mm. pressure to obtain 1-methyl-2-ethinyl-2-hydroxy-4-methoxy-cyclohexane. Boiling range 96–105° C.

Example 4

22.5 grams of thionyl chloride were added dropwise to a stirred solution of 30 grams of 1-methyl-2-ethinyl-2-hydroxy-4-methoxy-cyclohexane in 35 cc. of pyridine and 120 cc. of anhydrous ether at 0° C. over a period of ½ hour. The mixture was then stirred for 1.5 hours at room temperature and poured onto ice. The ether layer was separated, washed with water and dilute sulfuric acid to remove the pyridine, and finally with sodium carbonate to remove the sulfur dioxide. After distilling off the ether, the residue was distilled at 8 mm. to obtain 1-methyl-2-ethinyl-4-methoxy-cyclohexene-1. B. P. 80–84° C.

Example 5

35 grams of 1-methyl-2-ethinyl-2-hydroxy-4-methoxy-cyclohexane in 300 cc. of pyridine were hydrogenated at 760 mm. pressure and room temperature in the presence of 0.3 gram of palladium-calcium carbonate catalyst. The rate of hydrogen uptake dropped to 1/15 of the maximum when one mol had been consumed. The hydrogenation was interrupted and the catalyst filtered off. Most of the pyridine was distilled off in vacuo. The last 10–20 cc. were removed with dilute sulfuric acid from an ether solution of the residue. The ether solution was then washed with 10 per cent sodium bicarbonate solution, the ether removed and the residue distilled at 9 mm. pressure to obtain 1-methyl-2-hydroxy-2-vinyl-4-methoxy-cyclohexane. Boiling range 84–100° C.

Example 6

14.2 grams of 1-methyl-2-ethinyl-4-methoxy-cyclohexene-1 in 90 cc. of pyridine were hydrogenated at room temperature and 760 mm. pressure in the presence of 0.6 gram of palladium-calcium carbonate catalyst. When one mol of hydrogen had been taken up, the rate of hydrogen uptake dropped to 1/10 of the maximum, and the product was worked up as described in Example 5 for the corresponding 1-methyl-2-vinyl-2-hydroxy-4-methoxy-cyclohexane. 1-methyl-2-vinyl-4-methoxy-cyclohexene-1 was thus obtained. Boiling range at 13 mm. 80–84° C.

Example 7

400 grams of 2-hydroxy-4-ethoxy-toluene in 1 liter of ethanol were hydrogenated at 1800 pounds per square inch pressure in the presence of 70 grams Raney nickel catalyst. After 24 hours, the hydrogen uptake had ceased. The catalyst was filtered off, the solvent removed and the residue was taken up in ether and washed with 10 per cent sodium hydroxide solution. The residue from the ether solution was fractionally distilled at 8 mm. to obtain 1-methyl-2-hydroxy-4-ethoxy-cyclohexane. Boiling range 74–93° C.

Example 8

To a stirred solution of 329 grams of 1-methyl-2-hydroxy-4-ethoxy-cyclohexane in 3200 cc. of benzene was added dropwise a solution of 175 grams of chromium trioxide in 260 cc. each of water and acetic acid at such a rate as to maintain the temperature at 50° C. The reaction mixture was then stirred three hours at 50° C. and worked up in the same way as in the case of the methoxy-ketone, Example 2, to obtain 1-methyl-2-keto-4-ethoxy-cyclohexane. Boiling range 92–102° C.

Example 9

12 grams of lithium in 1500 cc. of liquid ammonia were treated with acetylene as described in Example 3, and the lithium acetylide formed was suspended in 1 liter of anhydrous ether. 167 grams of 1-methyl-2-keto-4-ethoxy-cyclohexane in 300 cc. of ether were added to the suspension over a period of one hour, the mixture stirred an additional three hours and worked up in the same way as in Example 3. The product was distilled at 12 mm. to obtain 1-methyl-2-ethinyl-2-hydroxy-4-ethoxy-cyclohexane. Boiling range 102–117° C.

Example 10

28.6 grams of thionyl chloride were added dropwise to a stirred, refluxing solution of 40 grams of 1 - methyl - 2-ethinyl-2-hydroxy-4-ethoxy-cyclohexane in 200 cc. of anhydrous ether and 42 cc. of pyridine. The mixture was cooled, treated with water at 0° C. and the ether layer separated. After being washed with dilute acid and sodium carbonate solution successively, the ether was removed and the residue distilled in a vacuum of 14 mm. There was thus obtained 1-methyl-2-ethinyl-4-ethoxy-cyclohexene. B. P. 96–98° C. at 14 mm.

Example 11

17.8 grams of 1-methyl-2-ethinyl-4-ethoxy-cyclohexene in 90 cc. of pyridine were hydrogenated at atmospheric pressure in the presence of a palladium on calcium carbonate catalyst. When one mol of hydrogen had been absorbed, the rate of hydrogen uptake dropped to ⅕ and the hydrogenation was interrupted. The catalyst was filtered off and the pyridine removed by distillation. The residue was distilled at 14 mm. to obtain 1-methyl-2-vinyl-4-ethoxy-cyclohexene. B. P. 91–93° C.

If 1 - methyl - 2-ethinyl-2-hydroxy-4-ethoxy-cyclohexane is hydrogenated in accordance with the procedure of Example 11, 1-methyl-2-vinyl-2-hydroxy-4-ethoxy-cyclohexane can be obtained.

The 2-hydroxy-4-ethoxy-toluene employed in Example 7 can be obtained in the following manner:

846 grams of 2-nitro-4-hydroxy-toluene were dissolved in a solution of 266 grams of sodium hydroxide and 2660 cc. of water. To the stirred solution were added 1023 grams of diethyl sulfate over a period of 50 minutes. The reaction mixture was then held at 90° C. for 30 minutes, made alkaline with sodium hydroxide and extracted with ether. After removal of the ether, the residue was distilled at 9 mm. to give 2-nitro-4-ethoxy-toluene. B. P. 136–138° C.

736 grams of 2-nitro-4-ethoxy-toluene thus obtained were dissolved in 3 liters of alcohol and hydrogenated in the presence of 50 grams of Raney nickel catalyst under 500 pounds per square inch hydrogen pressure. The temperature was kept between 50 and 100° C. After removal of catalyst and solvent, the 2-amino-4-ethoxy-toluene thus obtained was distilled at 8 mm. B. P. 127–128° C.

150 grams of the 2-amino-4-ethoxy-toluene were dissolved in a hot solution of 110 cc. of concentrated sulfuric acid and 2,000 cc. of water. After being cooled with stirring to 0° C., the mixture was diazotized with 69 grams of sodium nitrite in 270 cc. of water. The cold diazonium solution was added over a period of 15 minutes to a refluxing, stirred mixture of 2060 cc. benzene, 1420 cc. of water and 710 cc. of concentrated sulfuric acid. Refluxing and stirring were continued for 15 minutes. The reaction mixture was then cooled, the benzene layer separated and the residue, after removal of the benzene, distilled at 10 mm. The distillate was recrystallized from ligroin to obtain 2-hydroxy-4-ethoxy-toluene. M. P. 48.5° C.

It is intended that the products can be prepared and used in their various stereoisomeric forms and that all stereoisomers are included within the scope of the claims.

We claim:

1. Substituted cyclohexene-1 which contains as the only substituents a methyl radical in the 1-position, a monovalent unsaturated two-carbon hydrocarbon radical in the 2-position and a lower alkoxy radical in the 4-position.

2. 1 - methyl-2-ethinyl-4-lower alkoxy-cyclohexene-1.

3. 1 - methyl - 2 - vinyl-4-lower alkoxy-cyclohexene-1.

4. 1 - methyl - 2 - ethinyl - 4 - methoxy-cyclohexene-1.

5. 1 - methyl - 2 - ethinyl - 4 - ethoxy - cyclohexene-1.

6. 1 - methyl - 2 - vinyl - 4 - methoxy - cyclohexene-1.

7. 1 - methyl -2-vinyl-4-ethoxy-cyclohexene-1.

WILLIAM EDWIN SCOTT.
MOSES WOLF GOLDBERG.

REFERENCES CITED

The following references are of record in the file of this patent:

UNITED STATES PATENTS

| Number | Name | Date |
|---|---|---|
| 2,328,719 | Houghton et al. | Sept. 7, 1943 |
| 2,359,935 | Nudenberg et al. | Oct. 10, 1944 |
| 2,412,465 | Milas | Dec. 10, 1946 |

OTHER REFERENCES

Thesis by John M. Tome entitled "Synthesis and Allylic Rearrangement of 1-(2'-methylcyclohexen - 1' - al) - 3-methylpent-4-en-1-yn-3-ol," submitted in partial fulfillment of the requirement for the degree of Bachelor of Science at Massachusetts Institute of Technology, 1947, 25 pages.

Rupe: "Annalen der Chemie," vol. 459, pages 195–217 (1927).